(12) United States Patent
Kim et al.

(10) Patent No.: US 10,882,526 B2
(45) Date of Patent: Jan. 5, 2021

(54) APPARATUS AND METHOD FOR CONTROLLING DRIVE OF VEHICLE

(71) Applicants: HYUNDAI MOTOR COMPANY, Seoul (KR); KIA MOTORS CORPORATION, Seoul (KR)

(72) Inventors: Beom Jun Kim, Seoul (KR); Hoi Won Kim, Gwacheon-si (KR); Doo Jin Um, Seoul (KR); Dae Young Kim, Gwangmyeong-si (KR); Chan Il Park, Chungcheongbuk-do (KR); Jin Su Jeong, Suwon-si (KR); Dong Eon Oh, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 55 days.

(21) Appl. No.: 16/203,884

(22) Filed: Nov. 29, 2018

(65) Prior Publication Data

US 2019/0315358 A1  Oct. 17, 2019

Related U.S. Application Data

(60) Provisional application No. 62/655,831, filed on Apr. 11, 2018.

(30) Foreign Application Priority Data

Sep. 28, 2018  (KR) .................. 10-2018-0116231

(51) Int. Cl.
*B60W 30/18*  (2012.01)
*B60W 30/09*  (2012.01)
(Continued)

(52) U.S. Cl.
CPC ...... *B60W 30/18163* (2013.01); *B60W 30/09* (2013.01); *B60W 30/12* (2013.01);
(Continued)

(58) Field of Classification Search
CPC ....... B60W 2050/143; B60W 2554/00; B60W 30/09; B60W 30/12; B60W 30/18163;
(Continued)

(56) References Cited

U.S. PATENT DOCUMENTS

| | | |
|---|---|---|
| 5,521,579 A | 5/1996 | Bernhard |
| 6,055,467 A | 4/2000 | Mehring et al. |

(Continued)

FOREIGN PATENT DOCUMENTS

| | | |
|---|---|---|
| DE | 198 21 122 A1 | 6/1999 |
| DE | 101 14 187 A1 | 9/2002 |

(Continued)

OTHER PUBLICATIONS

European Search Report dated Oct. 2, 2019 from the corresponding European Application No. 19163402.1, 10 pages.

(Continued)

*Primary Examiner* — Atul Trivedi
(74) *Attorney, Agent, or Firm* — Brinks Gilson & Lione

(57) ABSTRACT

An apparatus for controlling drive of a vehicle includes an input device, and a control circuit. The control circuit performs a lane keeping control on a driving lane of the vehicle for a first time duration, when receiving a first input for changing a lane from the driver through the input device, performs a line access control such that the vehicle moves toward a line positioned in a direction of a target lane for the changing of the lane, after completing the lane keeping control for the first time duration, when receiving a second input for changing the lane from the driver through the input device after receiving the first input, and performs a lane
(Continued)

entrance control toward the target lane when the line access control is completed within a second time duration.

20 Claims, 8 Drawing Sheets

(51) Int. Cl.
*B60W 30/12* (2020.01)
*B60W 50/10* (2012.01)
*B60W 50/14* (2020.01)
*G08G 1/16* (2006.01)

(52) U.S. Cl.
CPC ............ *B60W 50/10* (2013.01); *B60W 50/14* (2013.01); *G08G 1/167* (2013.01); *B60W 2050/143* (2013.01)

(58) Field of Classification Search
CPC ......... B60W 2540/18; B60W 2540/20; B60W 50/10; B60W 50/14; B60W 2050/0068; B60W 2050/146; G08G 1/167
USPC .......................................................... 701/301
See application file for complete search history.

(56) References Cited

U.S. PATENT DOCUMENTS

| | | | |
|---|---|---|---|
| 6,473,678 B1 | 10/2002 | Satoh et al. | |
| 6,842,687 B2 | 1/2005 | Winner et al. | |
| 7,363,140 B2 | 4/2008 | Ewerhart et al. | |
| 7,821,421 B2* | 10/2010 | Tamir ..................... | G06Q 40/08 |
| | | | 340/901 |
| 8,073,595 B2* | 12/2011 | Tabata ................ | B60T 8/17557 |
| | | | 701/42 |
| 8,521,352 B1 | 8/2013 | Ferguson et al. | |
| 9,527,441 B2 | 12/2016 | Matsumura | |
| 10,183,668 B2 | 1/2019 | Takae | |
| 10,449,856 B2 | 10/2019 | Kojima | |
| 10,558,213 B2 | 2/2020 | Sato et al. | |
| 2003/0163239 A1 | 8/2003 | Winner et al. | |
| 2005/0256630 A1 | 11/2005 | Nishira et al. | |
| 2006/0009910 A1 | 1/2006 | Ewerhart et al. | |
| 2007/0255474 A1* | 11/2007 | Hayakawa .......... | B60T 8/17551 |
| | | | 701/70 |
| 2008/0172153 A1* | 7/2008 | Ozaki ..................... | G08G 1/04 |
| | | | 701/36 |
| 2009/0005933 A1* | 1/2009 | Tabata ................ | B60T 8/17557 |
| | | | 701/42 |
| 2009/0132125 A1* | 5/2009 | Yonezawa ............. | B60W 30/12 |
| | | | 701/41 |
| 2009/0299573 A1 | 12/2009 | Thrun et al. | |
| 2010/0010733 A1 | 1/2010 | Krumm | |
| 2010/0042282 A1 | 2/2010 | Taguchi et al. | |
| 2012/0296522 A1 | 11/2012 | Otuka | |
| 2013/0063595 A1* | 3/2013 | Niem ..................... | B60W 30/12 |
| | | | 348/148 |
| 2014/0074356 A1 | 3/2014 | Bone | |
| 2015/0006012 A1 | 1/2015 | Kammel et al. | |
| 2015/0019063 A1 | 1/2015 | Lu et al. | |
| 2015/0094899 A1 | 4/2015 | Hackenberg et al. | |
| 2015/0148985 A1 | 5/2015 | Jo | |
| 2015/0166062 A1 | 6/2015 | Johnson et al. | |
| 2015/0353082 A1 | 12/2015 | Lee et al. | |
| 2015/0360721 A1 | 12/2015 | Matsuno et al. | |
| 2016/0001781 A1* | 1/2016 | Fung ..................... | G16H 50/20 |
| | | | 701/36 |
| 2016/0187879 A1 | 6/2016 | Mere et al. | |
| 2016/0225261 A1 | 8/2016 | Matsumoto | |
| 2016/0250968 A1 | 9/2016 | Shirakata et al. | |
| 2016/0272204 A1 | 9/2016 | Takahashi et al. | |
| 2016/0288707 A1 | 10/2016 | Matsumura | |
| 2016/0297431 A1 | 10/2016 | Eigel et al. | |
| 2016/0339913 A1 | 11/2016 | Yamashita et al. | |
| 2017/0108865 A1 | 4/2017 | Rohde et al. | |
| 2017/0124882 A1* | 5/2017 | Wang ................. | G06K 9/00798 |
| 2017/0197637 A1* | 7/2017 | Yamada ................ | G08G 1/167 |
| 2017/0203763 A1* | 7/2017 | Yamada ................ | B60W 10/18 |
| 2017/0203764 A1 | 7/2017 | Fujiki et al. | |
| 2017/0240172 A1 | 8/2017 | Nishiguchi et al. | |
| 2017/0240186 A1 | 8/2017 | Hatano | |
| 2017/0243491 A1* | 8/2017 | Fujii ..................... | B60W 30/12 |
| 2017/0313313 A1 | 11/2017 | Asakura | |
| 2017/0315556 A1 | 11/2017 | Mimura | |
| 2017/0334460 A1 | 11/2017 | Arakawa et al. | |
| 2017/0341652 A1 | 11/2017 | Sugawara et al. | |
| 2017/0349212 A1* | 12/2017 | Oshida ............... | B62D 15/0255 |
| 2017/0368936 A1 | 12/2017 | Kojima | |
| 2018/0029604 A1 | 2/2018 | Niino et al. | |
| 2018/0033309 A1* | 2/2018 | Norwood ............. | B62D 15/029 |
| 2018/0043906 A1 | 2/2018 | Huang | |
| 2018/0046185 A1 | 2/2018 | Sato et al. | |
| 2018/0050659 A1 | 2/2018 | Coburn | |
| 2018/0074497 A1* | 3/2018 | Tsuji ................. | G08G 1/096888 |
| 2018/0088574 A1 | 3/2018 | Latotzki et al. | |
| 2018/0091085 A1 | 3/2018 | Tamagaki et al. | |
| 2018/0111628 A1 | 4/2018 | Tamagaki et al. | |
| 2018/0154939 A1 | 6/2018 | Aoki | |
| 2018/0173225 A1 | 6/2018 | Kim et al. | |
| 2018/0178713 A1* | 6/2018 | Fujii ................... | B62D 15/0255 |
| 2018/0178714 A1* | 6/2018 | Fujii .................. | B62D 15/0255 |
| 2018/0178715 A1* | 6/2018 | Fujii ....................... | B60Q 1/40 |
| 2018/0178716 A1* | 6/2018 | Fujii ..................... | B60W 10/20 |
| 2018/0197414 A1* | 7/2018 | Oooka ..................... | B60T 7/12 |
| 2018/0209801 A1* | 7/2018 | Stentz ................ | B60W 60/0011 |
| 2018/0215387 A1 | 8/2018 | Takae | |
| 2018/0239352 A1 | 8/2018 | Wang et al. | |
| 2018/0251155 A1* | 9/2018 | Chan ..................... | G08G 1/167 |
| 2018/0292820 A1 | 10/2018 | Markberger | |
| 2018/0297638 A1* | 10/2018 | Fujii ................... | B62D 15/0255 |
| 2018/0297639 A1* | 10/2018 | Fujii ..................... | G05D 1/0212 |
| 2018/0297640 A1* | 10/2018 | Fujii ..................... | G05D 1/0257 |
| 2018/0339708 A1 | 11/2018 | Geller | |
| 2018/0345959 A1* | 12/2018 | Fujii ..................... | B60W 30/0956 |
| 2018/0345960 A1* | 12/2018 | Fujii ..................... | B60W 30/0953 |
| 2018/0346027 A1 | 12/2018 | Fujii | |
| 2018/0350242 A1* | 12/2018 | Fujii ............... | B60W 30/18163 |
| 2018/0370542 A1 | 12/2018 | Braunagel et al. | |
| 2019/0026918 A1 | 1/2019 | Gomezcaballero et al. | |
| 2019/0135290 A1 | 5/2019 | Marden et al. | |
| 2019/0155279 A1 | 5/2019 | Tayama | |
| 2019/0185005 A1 | 6/2019 | Fukuda | |
| 2019/0291728 A1* | 9/2019 | Shalev-Shwartz .......................... | |
| | | | B60W 40/105 |
| 2019/0315362 A1* | 10/2019 | Um ....................... | B60W 50/08 |
| 2019/0317494 A1 | 10/2019 | Lee et al. | |
| 2020/0001714 A1 | 1/2020 | Kojima | |
| 2020/0073396 A1* | 3/2020 | Shimizu .......... | B60W 30/18145 |

FOREIGN PATENT DOCUMENTS

| | | |
|---|---|---|
| DE | 10 2004 005815 B3 | 6/2005 |
| DE | 10 2004 048 468 A1 | 4/2006 |
| DE | 10 2007 005 245 A1 | 11/2007 |
| DE | 10 2012 001405 A1 | 11/2012 |
| DE | 10 2011 109618 A1 | 2/2013 |
| DE | 10 2012 008090 A1 | 10/2013 |
| DE | 10 2014 225 680 A1 | 6/2016 |
| DE | 10 2015 205131 A1 | 9/2016 |
| DE | 10 2016 202946 A1 | 9/2016 |
| DE | 10 2015 206969 | 10/2016 |
| DE | 10 2015 209476 A1 | 11/2016 |
| DE | 10 2015 219231 A1 | 4/2017 |
| DE | 10 2015 224244 A1 | 6/2017 |
| DE | 10 2016 007187 A1 | 6/2017 |
| DE | 10 2016 215565 A1 | 2/2018 |
| DE | 10 2016 216134 A1 | 3/2018 |
| EP | 1074904 A1 | 2/2001 |
| EP | 1607264 A1 | 12/2005 |
| EP | 2116984 A1 | 11/2009 |
| EP | 2657921 A1 | 10/2013 |
| EP | 2978648 A1 | 2/2016 |
| EP | 3075618 A2 | 10/2016 |

(56) References Cited

FOREIGN PATENT DOCUMENTS

| | | |
|---|---|---|
| EP | 3239960 A1 | 11/2017 |
| EP | 3 264 211 A1 | 1/2018 |
| EP | 3284646 A1 | 2/2018 |
| EP | 3075618 A3 | 5/2018 |
| JP | 2003-025868 A | 1/2003 |
| JP | 2015-138330 A | 7/2015 |
| JP | 2016-151815 A | 8/2016 |
| JP | 2016-196285 A | 11/2016 |
| KR | 10-0578573 B1 | 5/2006 |
| KR | 10-1779823 B1 | 10/2017 |
| KR | 10-2018-0070401 A | 6/2018 |
| WO | 2010-088869 A1 | 8/2010 |
| WO | 2012-131405 A1 | 10/2012 |
| WO | 2014-154771 A1 | 10/2014 |
| WO | 2017-018133 A1 | 2/2017 |
| WO | 2017 064941 A1 | 4/2017 |
| WO | 2017-168013 A1 | 10/2017 |
| WO | 2017 168013 A1 | 10/2017 |
| WO | 2018-033389 A1 | 2/2018 |
| WO | 2017-017793 A1 | 6/2018 |

OTHER PUBLICATIONS

European Search Report dated Oct. 2, 2019 from the corresponding European Application No. 19162795.9, 8 pages.
European Search Report dated Oct. 14, 2019 from the corresponding European Application No. 19161253.0, 11 pages.
European Search Report dated Oct. 18, 2019 from the corresponding European Application No. 19167268.2, 8 pages.
European Search Report dated Oct. 23, 2019 from the corresponding European Application No. 19167266.6, 9 pages.
Office Action dated Oct. 16, 2019 from U.S. Appl. No. 16/204,362, 32 pages.
European Search Report dated Jul. 1, 2019 from the corresponding European Application No. 18210398.6, 9 pages.
European Search Report dated Jul. 3, 2019 from the corresponding European Application No. 18210063.6, 10 pages.
European Search Report dated Jul. 18, 2019 from the corresponding European Application No. 18210400.0, 5 pages.
European Search Report dated Jul. 22, 2019 from the corresponding European Application No. 18210403.4, 8 pages.
European Search Report dated Jul. 22, 2019 from the corresponding European Application No. 18210401.8, 8 pages.
European Search Report dated Jul. 25, 2019 from the corresponding European Application No. 18209168.6, 9 pages.
European Search Report dated Jul. 25, 2019 from the corresponding European Application No. 19156387.3, 8 pages.
European Search Report dated Aug. 2, 2019 from the corresponding European Application No. 19167271.6, 8 pages.
European Search Report dated Aug. 22, 2019 from the corresponding European Application No. 19167263.3, 8 pages.
European Search Report dated Aug. 30, 2019 from the corresponding European Application No. 19167269.0, 9 pages.
European Search Report dated Aug. 30, 2019 from the corresponding European Application No. 19167267.4, 8 pages.
European Search Report dated May 11, 2020 from the corresponding European Application No. 19167265.8, 9 pages.
Office Action for U.S. Appl. No. 16/204,400 dated Jun. 1, 2020, 44 pages.
Notice of Allowance for U.S. Appl. No. 16/204,362 dated Jul. 9, 2020, 21 pages.
European Search Report dated Mar. 27, 2020 from the corresponding European Application No. 19167264.1, 8 pages.
European Search Report dated Apr. 21, 2020 from the corresponding European Application No. 19167270.8, 8 pages.
U.S. Office Action dated Feb. 4, 2020 from the corresponding U.S. Appl. No. 16/296,890, 19 pp.
U.S. Office Action dated Mar. 25, 2020 from the corresponding U.S. Appl. No. 16/204,362 , 27 pp.
Office Action dated Aug. 12, 2020 from the corresponding U.S. Appl. No. 16/192,279, 60 pages.
Office Action dated Sep. 15, 2020 from the corresponding U.S. Appl. No. 16/206,170, 23 pages.

\* cited by examiner

APPARATUS AND METHOD FOR CONTROLLING DRIVE OF VEHICLE

CROSS-REFERENCE TO RELATED APPLICATIONS

This application claims priority to and the benefit of Korean Patent Application No. 10-2018-0116231, filed on Sep. 28, 2018, which claims priority to and the benefit of U.S. Patent Application No. 62/655,831, filed on Apr. 11, 2018, the entirety of each of which are incorporated herein by reference.

FIELD

The present disclosure relates to an apparatus and a method for providing a function of changing a lane a vehicle.

BACKGROUND

The statements in this section merely provide background information related to the present disclosure and may not constitute prior art.

With the development of vehicle industry, an autonomous driving system and a driving assist system, which partially allows autonomous driving, (hereinafter, autonomous driving and driving assist are collectively referred to as "autonomous driving" for the convenience of explanation) have been developed. The autonomous driving system may provide various functions such as maintaining a set speed, maintaining a distance between vehicles, maintaining a lane, and changing a lane. The autonomous driving system may perform autonomous driving by using various devices such as a sensor to sense an external environment of a vehicle, a sensor to sense information about the vehicle, a global positioning system (GPS), a detailed map, a system for detecting the state of a driver, a steering actuator, an acceleration/deceleration actuator, a communication circuit, and a control circuit (e.g., an electronic control unit (ECU)). The autonomous driving system may change the lane based on, for example, the input of the driver.

SUMMARY

The present disclosure addresses a control strategy of providing the safety of a driver of a vehicle changing a lane and the safety of a driver of a neighboring vehicle, when the lane is changed. The control strategy may have the limitation on time and need to consider various cancellation conditions of the lane change due to safety concerns.

The present disclosure has been made to solve the above-mentioned problems occurring in the prior art while advantages achieved by the prior art are maintained intact.

An aspect of the present disclosure provides an apparatus and a method for performing a vehicle control strategy, capable of providing the safety of a vehicle and the safety of a neighboring vehicle when a lane is changed.

The technical problems to be solved by the present inventive concept are not limited to the aforementioned problems, and any other technical problems not mentioned herein will be clearly understood from the following description by those skilled in the art to which the present disclosure performs.

According to an aspect of the present disclosure, an apparatus for controlling drive of a vehicle may include: at least one input device configured to receive an input from a driver of the vehicle, and a control circuit electrically connected with the at least one input device. The control circuit may perform a lane keeping control on a driving lane of the vehicle for a first time duration, when receiving a first input for changing a lane from the driver through the at least one input device, may perform a line access control such that the vehicle moves toward a line positioned in a direction of a target lane for the changing of the lane, after completing the lane keeping control for the first time duration, when receiving a second input for changing the lane from the driver through the at least one input device after receiving the first input, and may perform a lane entrance control toward the target lane when the line access control is completed within a second time duration.

According to one form, the at least one input device may include a first input device and a second input device. The first input may be received through the first input device, and the second input may be received through the second input device.

According to another form, the first input device may be a turn signal lever, and the second input device may be a steering wheel, a switch, or a button.

According to another form, the apparatus may further include an output device, and the control circuit may output a message associated with changing the lane through the output device, when receiving the first input.

According to another exemplary form, the control circuit may stop the lane change, when a specified cancellation condition is satisfied while the lane keeping control or the line access control is being performed.

According to another form, the specified cancellation condition may be satisfied: when a dangerous situation is sensed; when a system is shut down by the driver; when the system reaches a limit situation; when hands-off of the driver is sensed; when a turn signal lamp is turned off by the driver; when initiation of the changing of the lane is delayed; or when lateral-movement is discontinuous.

According to another form, the specified cancellation condition may be satisfied when it is predicted that completion of the line access control is impossible within the second time duration.

According to another form, the control circuit may stop changing the lane and may continuously perform the lane keeping control on the driving lane, when the specified cancellation condition is satisfied during the lane keeping control.

According to another form, the control circuit may stop the lane change and may perform a lane return control to return the vehicle to a centerline of the driving lane on the driving lane, when the specified cancellation condition is satisfied during the line access control.

According to another form, the control circuits may stop the lane return control, when the specified cancellation condition is canceled during the lane return control, and may perform the line access control, when the first input and the second input are received.

According to another form, the apparatus may further include an output device, and the control circuits may output a warning through the output device and maintains the lane entrance control, when the specified cancellation condition is satisfied during the lane entrance control.

According to another form, the specified cancellation condition may be satisfied when it is predicted that completion of the lane entrance control is impossible for a third time duration.

According to another form, the control circuit may perform the lane keeping control on the target lane, when completing the lane entrance control within a third time duration.

According to another aspect of the present disclosure, a method for controlling drive of a vehicle may include: performing, by a control circuit, a lane keeping control on a driving lane of the vehicle for a first time duration, when receiving a first input for changing a lane from the driver of the vehicle; when receiving a second input for changing the lane from the driver after receiving the first input, performing a line access control such that the vehicle moves toward a line positioned in a direction of a target lane for the changing of the lane, after the lane keeping control is completed for the first time duration, and performing, by the control circuit, a lane entrance control toward the target lane when the line access control is completed within a second time duration.

According to another form, the method may include stopping, by the control circuit, the lane change, when a specified cancellation condition is satisfied while the lane keeping control or the line access control is being performed.

According to an exemplary form, stopping the lane change may include stopping changing the lane and continuously performing the lane keeping control on the driving lane, when the specified cancellation condition is satisfied during the lane keeping control.

According to another exemplary form, stopping the lane change may include stopping changing the lane and performing a lane return control to return the vehicle to a centerline of the driving lane, when the specified cancellation condition is satisfied during the line access control.

According to another form, the method may include stopping the lane return control, when the specified cancellation condition is canceled during the lane return control, and performing the line access control, when the first input and the second input are received.

According to another form, the method may further include outputting a warning through an output device, and maintaining the lane entrance control, when the specified cancellation condition is satisfied during the lane entrance control.

According to other form, the method may further include performing, by the control circuit, the lane keeping control on the target lane, when the lane entrance control is completed for a third time duration.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
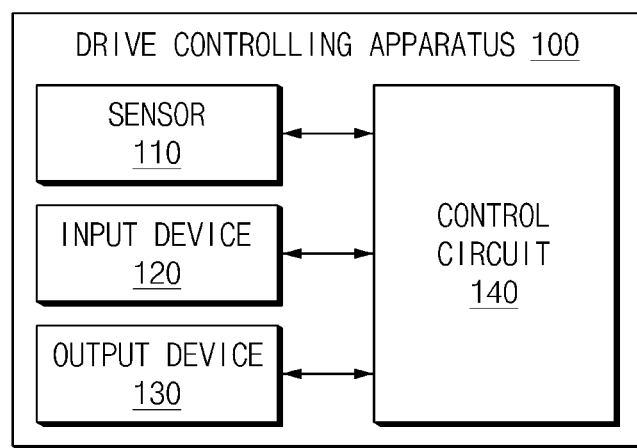
FIG. 1 is a block diagram illustrating the component of an apparatus for controlling the drive of a vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In addition, in the following description of the present disclosure, a detailed description of well-known features or functions will be ruled out in order not to unnecessarily obscure the gist of the present disclosure.

In describing components of exemplary forms of the present disclosure, the terms $1^{st}$, $2^{nd}$, first, second, A, B, (a), (b), and the like may be used herein. These terms are only used to distinguish one component from another component, but do not limit the corresponding components irrespective of the order or priority of the corresponding components. Unless otherwise defined, all terms used herein, including technical or scientific teams, have the same meanings as those generally understood by those skilled in the art to which the present disclosure performs. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating the component of an apparatus for controlling the drive of a vehicle, according to an exemplary form of the present disclosure.

Referring to FIG. 1, in one form, an apparatus 100 for controlling the drive of a vehicle (vehicle drive controlling apparatus) may include a sensor 110, an input device 120, an output device 130, and a control circuit 140. The vehicle drive controlling apparatus 100 of FIG. 1 may be a part of an autonomous driving system and may be mounted in the vehicle.

The sensor 110 may be configured to sense information on an external environment of a vehicle and information on a vehicle having the vehicle drive controlling apparatus 100 mounted therein. The sensor 110 may sense an advancing vehicle, a rear vehicle, a line of a lane, another external object, and the like, and may sense the speed of the vehicle, a steering angle, a wheel speed, a yaw rate, and the like.

The input device 120 may be configured to receive the input from a driver of the vehicle. The input device 120 may be configured to, for example, receive a command for changing a lane from the driver. The input device 120 may include, for example, a first input device and a second input device. The first input device may be, for example, a turn signal lever, and the second input device may be, for example, a steering wheel, a switch or a button. For another example, the vehicle may include one input device to receive the command for changing the lane, and the first input device and the second input device may be the same type of input devices.

The output device 130 may be configured to output information that is able to be sensed by the driver inside the vehicle. The output device 130 may include, for example, a speaker, a display, and/or a vibration motor.

As not illustrated in FIG. 1, the vehicle drive controlling apparatus 100 may further include a steering device, an acceleration device, and a deceleration device.

The control circuit 140 may be electrically connected with the sensor 110, the input device 120, and the output device 130. The control circuit 140 may control the sensor 110, the input device 120, and the output device 130, and may perform various data processing and various computations. The control circuit 140 may be, for example, an electronic control unit (ECU), a micro-controller unit (MCU), or a sub-controller mounted in the vehicle.

According to another form, the control circuit 140 may perform a control operation of maintaining a lane (lane keeping control). The control circuit 140 may perform, for example, lane keeping control by using a driving assist system on a dedicated road to a vehicle.

According to other form, the control circuit 140 may receive a first input of a driver for changing a lane through the input device 120. The control circuit 140 may receive the first input through the first input device. For example, the control circuit 140 may receive an input for the turn signal lever by an action of a driver intending to change the lane.

In another form, the control circuit 140 may perform the lane keeping control for a first time duration, when receiving the first input. The control circuit 140 may flicker a turn signal lamp, when receiving the first input. The control circuit 140 may continuously perform the lane keeping control for the first time duration (e.g., one second) without instantly moving the vehicle in a lateral direction. The vehicle drive controlling apparatus 100 may notify the intention of the driver to change the lane to a neighboring vehicle while continuously performing the lane keeping control for the first time duration. Accordingly, the safety may be provided when the lane is changed.

According to another exemplary form, the control circuit 140 may output a message associated with the changing of lane by using the output device 130, when receiving the first input. For example, the control circuit 140 may output a message of notifying the commencement of changing of the lane onto a display after receiving the first input.

According to other exemplary form, the control circuit 140 may stop changing the lane, if a specified cancellation condition is satisfied while the lane keeping control is being performed. For example, the specified cancellation condition may be satisfied when a dangerous situation (e.g., the infringement of a safety distance) is sensed, when a system is shut down by a driver, when a system reaches a limit situation (e.g., the system fails to sense a line of a lane), when the hands-off of the driver is sensed, when a turn signal lamp is turned off by the driver, when the commencement of the changing of the lane is delayed (e.g., within 10 second after the first input is received), when the lateral-movement is discontinuous. For another example, the cancellation condition may be satisfied only when the completion of the line access control is impossible within a second time duration (e.g., 5 seconds or 10 seconds). When it takes an excessive long time to perform the line access control, the safety may be reduced. Accordingly, the above-described cancellation condition may be set. For example, when the second input is delayed after the first input is received, it may be impossible to complete the line access control within the second time duration. In this case, the cancellation condition may be satisfied while the line access control is being performed. The control circuit 140 may calculate an expected time (time to line touch; TLC) that it takes to complete the line access control. When the calculated TLC is greater than a remaining time that it takes to change the lane, the cancellation condition is determined as being satisfied. TLC may be $DLC/V_y$ or LC. In this case, DLC, which represents "distance to lane crossing", refers to a distance between a line and a first tire of the vehicle passing through the line. The remaining time that it takes to change the lane may be obtained by subtracting time, which is elapsed from the first input, from the second time duration.

According to another form, the control circuit 140 may stop changing the lane and may continuously perform the lane keeping control, if a specified cancellation condition is satisfied while the lane keeping control is being performed. The control circuit 140 may turns off the turn signal lamp and may perform the lane keeping control similarly to the case before the lane is changed The control circuit 140 may automatically cancel the changing of the lane, when the cancellation condition is satisfied and thus the lane is not safely changed.

According to another exemplary form, the control circuit 140 may receive a second input of a driver for changing a lane through at least one input device 120 after the first input is received. The control circuit 140 may receive the second input through the second input device. For example, the control circuit 140 may receive an input for a steering wheel, a switch, or a button by an action of a driver intending to change the lane. The vehicle drive controlling apparatus 100 may exactly recognize the intention of the driver to change the lane by receiving the first input and the second input.

In another form, the control circuit 140 may perform a control operation of accessing a line (i.e., line access control) to move the vehicle toward a line positioned in a direction of a target lane for changing the lane, after completing the lane keeping control for the first time duration, when receiving the second input. For example, the control circuit 140 may perform the line access control after continuously performing the lane keeping control for the first time duration when the second input is received within the first time duration. For another example, the control circuit 140 may perform the line access control immediately when the second input is received after the first time duration is elapsed. The line access control may be a control operation of moving the vehicle toward the line, which is positioned in the direction of the target lane, in a lateral direction on a driving lane.

According to another form, the control circuit 140 may stop changing the lane, if a specified cancellation condition is satisfied while the line access control is being performed. The cancellation condition set when the line access control is being performed may be the same as the cancellation condition set when the lane keeping control is being performed.

According to an exemplary form, the control circuit 140 may stop changing the lane and may perform a control operation of returning the lane (lane return control) on the driving lane such that the vehicle is returned to the centerline of the driving lane, when a specified cancellation condition is satisfied while the line access control is being performed. The control circuit 140 may move the vehicle in the lateral direction toward the centerline of the driving lane, when the cancellation condition is satisfied after the vehicle is moved in the lateral direction on the driving lane, while the line access control is being performed. The lane return control may be performed identically to the lane keeping control.

When the lane return control is completed, the control circuit 140 may continuously perform the lane keeping control.

According to an exemplary form, the control circuit 140 may stops the lane return control, when the specified cancellation condition is canceled while the lane return control is being performed, and may perform the line access control, when the first input and the second input are received again. The cancellation condition may be canceled while the lane return control is being performed. While the cancellation condition is being canceled, the first input and the second input may be received again. In this case, the control circuit 140 may resume the line access control without completing the lane return control, that is, without moving the vehicle toward the centerline of the driving lane for the purpose of improving control efficiency.

According to another exemplary form, the control circuit 140 may perform a control operation of entering a lane (i.e., a lane entrance control) toward a target lane, when the line access control is completed within the second time duration. The control circuit 140 may move the vehicle in the lateral direction toward the target lane such that the vehicle enters the target lane, when the vehicle sufficiently accesses the lane. The control circuit 140 may align the vehicle such that the lane keeping control is possible after the vehicle enters the target lane while the lane entrance control is being performed. The lane entrance control may be continuously performed until all wheels of the vehicle pass through the line.

According to another form, the control circuit 140 may output a warning through the output device 130 and may continuously perform the lane entrance control, when the specified cancellation condition is satisfied while the lane entrance control is being performed.

For example, the specified cancellation condition may be satisfied when a dangerous situation (e.g., the infringement of a safety distance) is sensed, when a system is shut down by a driver, when a system reaches a limit situation (e.g., the system fails to sense a line of a lane), when the hands-off of a driver is sensed, when a turn signal lamp is turned off by the driver, when the commencement of the changing of the lane is delayed (e.g., within 10 second after the first input is received) or when the lateral-movement is discontinuous. For another example, the cancellation condition may be satisfied only when a completion of the lane entrance control is impossible within a third time duration (e.g., 5 seconds). When it takes an excessive long time to perform the lane entrance control, the safety may be reduced. Accordingly, the above-described cancellation condition may be set. The control circuit 140 may calculate an expected time (remaining to lane change; RTLC) it takes to complete the lane entrance control. When the RTLC is greater than a remaining time that it takes to change the lane, the cancellation condition is determined as being satisfied. In this case, the RDLC may be DLT/$V_y$, LC. The RDLC, which represents a remaining distance to lane change, may refer to a distance between a line and a last tire of the vehicle passing through the line and, the $V_y$, LC may refer to an average lateral movement speed used when the lane is changed. The remaining time that it takes to change the lane may be obtained by subtracting time, which is elapsed from the infringement of the line, from the third time duration.

Since it may be more dangerous that the vehicle returns to a previous lane after the lane entrance control is commenced even if the cancellation condition is satisfied, the control circuit 140 may output a warning through the output device 130 and may continuously perform the lane entrance control. The control circuit 140 may output, for example, a visible warning, an auditory warning, and/or a tactile warning.

According to another form, the control circuit 140 may perform the lane keeping control on the target lane when the line access control is completed within the third time duration. The control circuit 140 may resume the lane keeping control and may move the vehicle to the centerline of the lane, when all the wheels of the vehicle enter the target lane. Accordingly, the changing of the lane may be completed.

Figure 2:
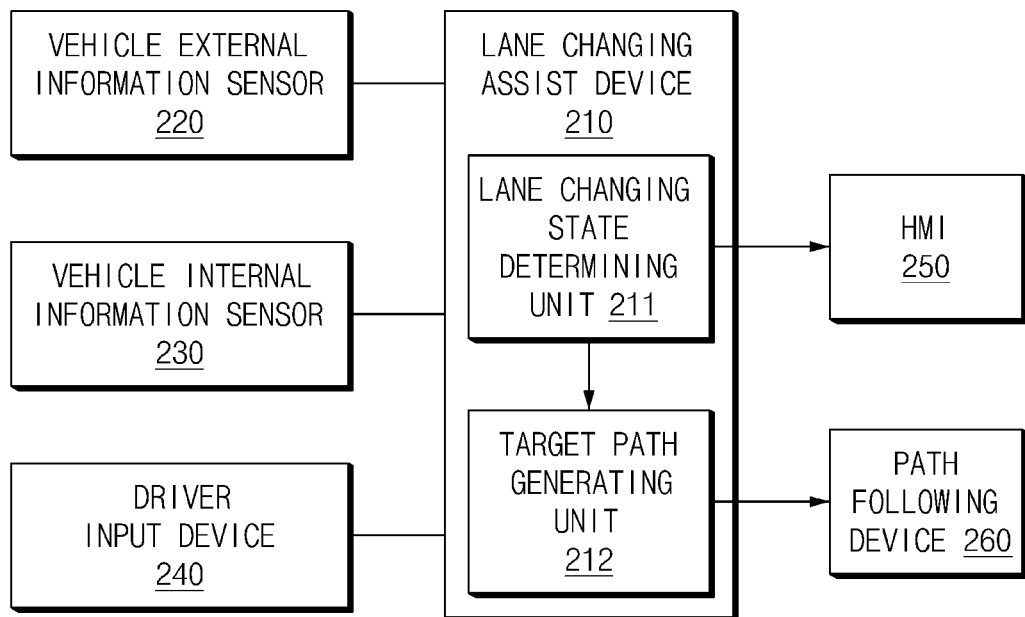
FIG. 2 is a block diagram illustrating components included in a vehicle.

FIG. 2 is a block diagram illustrating components included in the vehicle, according to an exemplary form of the present disclosure.

Referring to FIG. 2, the vehicle may include a lane changing assist device 210, a vehicle external information sensor 220, a vehicle internal information sensor 230, a driver input device 240, an HMI 250, and a path following device 260.

The lane changing assist device 210 may be mounted in the vehicle. The lane changing assist device 210 may determine whether the lane change control is able to be performed, in response to the input of the driver, and may perform steering control and acceleration/deceleration control for the lane change control. The lane changing assist device 210 may include a lane change state determiner 211 and a target path generator 212. The lane change state determiner 211 may determine the state associated with changing of the lane by totally considering whether there is present the input of a driver and whether lane changing is possible. The target path generator 212 may generate a path appropriate to the driving of the vehicle, depending on the state associated with the changing of the lane.

The vehicle external information sensor 220 may include a sensor, such as a camera, a rader, or a LiDAR, to sense a line of a lane and an object, and may include a sensor, such as a navigation, to determine an attribute of a driving lane.

The vehicle internal information sensor 230 may detect the driving state of the vehicle and may include an acceleration sensor and a yaw rate sensor.

The driver input device 240 may include means for detecting the intentional action of the driver to a steering system such as a switch and a steering torque sensor.

The HMI 250 may display a screen such that a driver recognizes a lane state, which is changed, inside the vehicle.

The path following device 260 may perform a control operation to follow a target path through the control of an actuator such as a motor driven power steering system (MDPS) or an electronic stability control (ESC).

Figure 3:
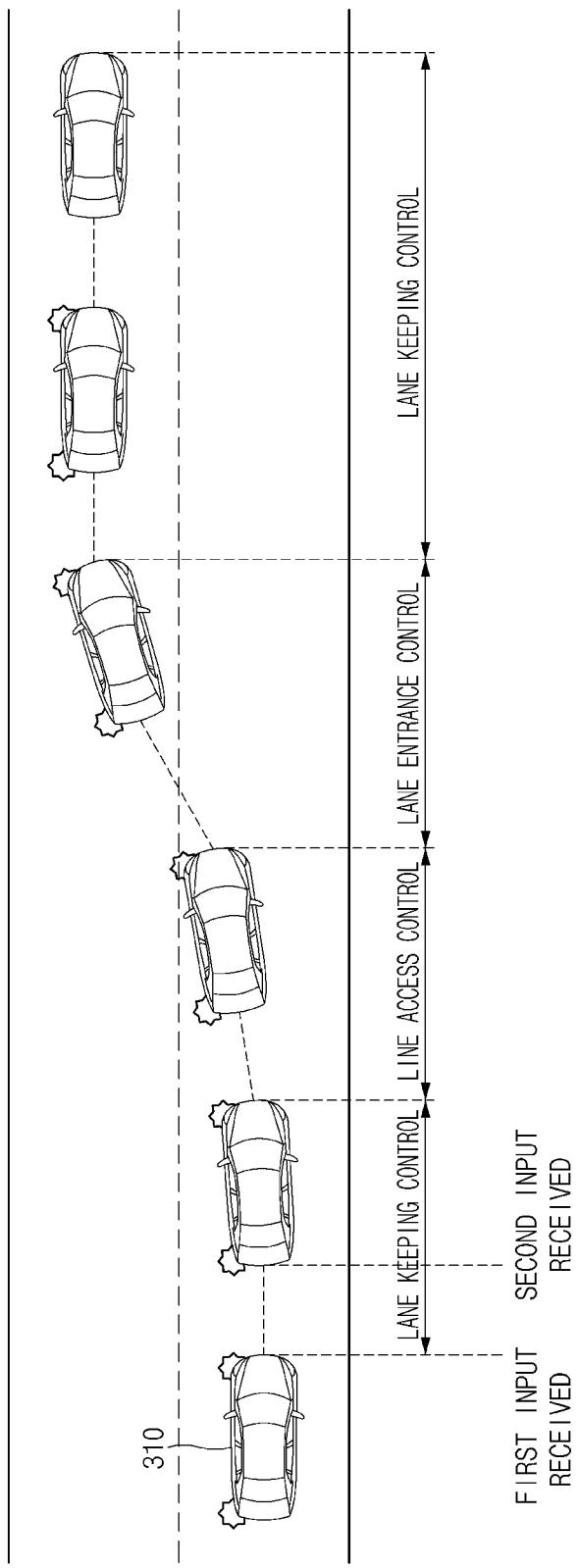
FIG. 3 is a view illustrating an exemplary operation of an apparatus for controlling the drive of a vehicle.

FIG. 3 is a view illustrating an exemplary operation of an apparatus for controlling the drive of a vehicle, according to an exemplary form of the present disclosure.

Referring to FIG. 3, a vehicle 310 may change a lane from a driving lane to a target lane. The vehicle 310 may flicker a turn signal lamp, when receiving the first input. The vehicle 310 may perform lane keeping control for at least first time duration after the first input is received. The vehicle 310 may commence the line access control after the lane keeping control is continuously performed for the first time duration, when the second input is received within the first time duration. The vehicle 310 may immediately commence the line access control when the second input is received after the first time duration.

The vehicle 310 may perform the line access control toward a line interposed between the driving lane and the target lane. The vehicle 310 may move in a lateral direction toward the line. The vehicle 310 may complete the line access control within the second time duration.

The vehicle 310 may perform lane entrance control when the line access control is completed. The wheel of the vehicle 310 may pass through a line while the lane entrance control is being performed. The vehicle 310 may move in a lateral direction toward the target lane. The vehicle entrance control may be continuously performed from a time that the wheel of the vehicle 310 starts to pass through the line to a time that all wheels of the vehicle 310 pass through the line.

The vehicle 310 may perform the lane keeping control when the lane entrance control is completed. The vehicle 310 may move in a lateral direction toward the centerline of the target lane. When the vehicle 310 moves the centerline of the target lane, the vehicle 310 may turn off the turn signal lamp.

Figure 4:
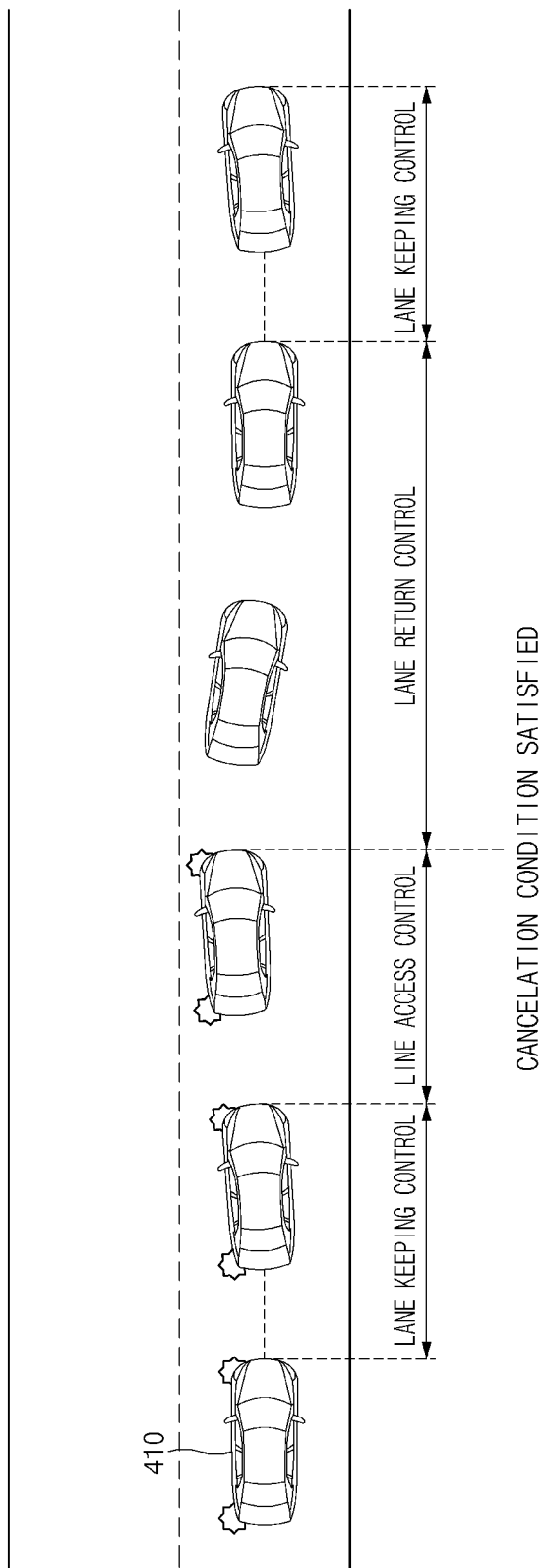
FIG. 4 is a view illustrating an exemplary operation of an apparatus for controlling the drive of a vehicle.

FIG. 4 is a view illustrating an exemplary operation of a vehicle drive control apparatus of a vehicle, according to another form of the present disclosure.

Referring to FIG. 4, a vehicle 410 may change a lane from a driving lane toward a target lane. The vehicle 410 may flicker a turn signal lamp, when receiving the first input. The vehicle 410 may commence line access control when the second input is received.

The vehicle 410 may perform the line access control toward a line interposed between the driving lane and the target lane. The vehicle 410 may move in a lateral direction toward the line. The specified cancellation condition may be satisfied while the line access control is being performed.

When the cancellation condition is satisfied, since the vehicle 410 may be too dangerous to change the lane, the vehicle 410 may stop changing the lane and may perform lane return control. The vehicle 410 may stop changing the lane, may turn off the turn signal lamp, and may move in the lateral direction toward the centerline of the driving lane. The lane return control may be performed in the same manner as the manner of the lane keeping control.

When the lane return control is completed, the vehicle 410 may continuously perform the lane keeping control at the centerline of the driving lane.

Figure 5:
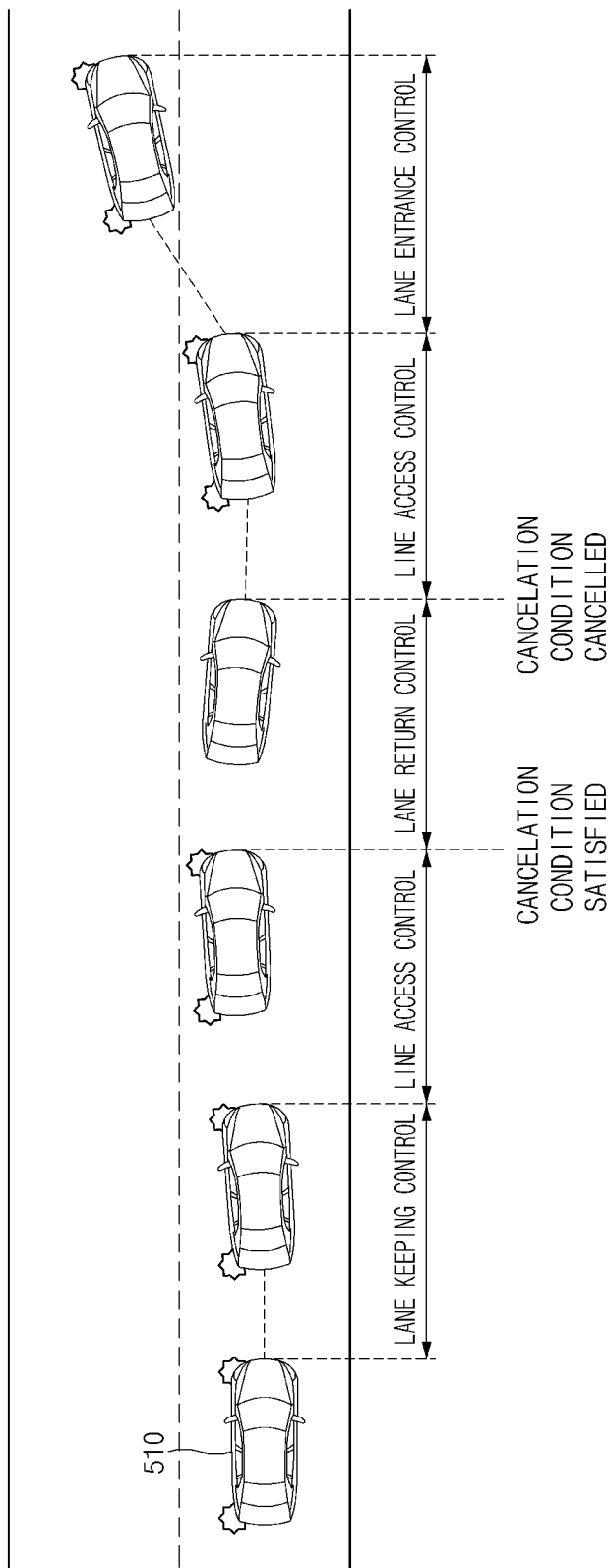
FIG. 5 is a view illustrating an exemplary operation of an apparatus for controlling the drive of a vehicle.

FIG. 5 is a view illustrating an exemplary operation of a vehicle drive controlling apparatus, according to an exemplary form of the present disclosure.

Referring to FIG. 5, a vehicle 510 may change a lane from a driving lane to a target lane. The vehicle 510 may flickers a turn signal lamp, when receiving the first input. The vehicle 510 may commence the line access control when the second input is received.

The vehicle 510 may perform the line access control toward a line interposed between the driving lane and the target lane. The vehicle 510 may move in a lateral direction toward the line. The specified cancellation condition may be satisfied while the line access control is being performed.

When the cancellation condition is satisfied, since the vehicle 510 is too dangerous to change the lane, the vehicle 510 may stop changing the lane and may perform lane return control. The vehicle 510 may stop changing the lane, may turn off the turn signal lamp, and may move in the lateral direction toward the centerline of the driving lane. The lane return control may be performed in the same manner as the manner of the lane keeping control.

The vehicle 510 may perform the line access control again, when the cancellation condition is canceled during the lane return control and the first input and the second input are received again. The vehicle 510 may flicker the turn signal lamp without completing the lane return control and may resume the line access control, for the control efficiency.

The vehicle 510 may perform the lane entrance control when the line access control is completed.

Figure 6:
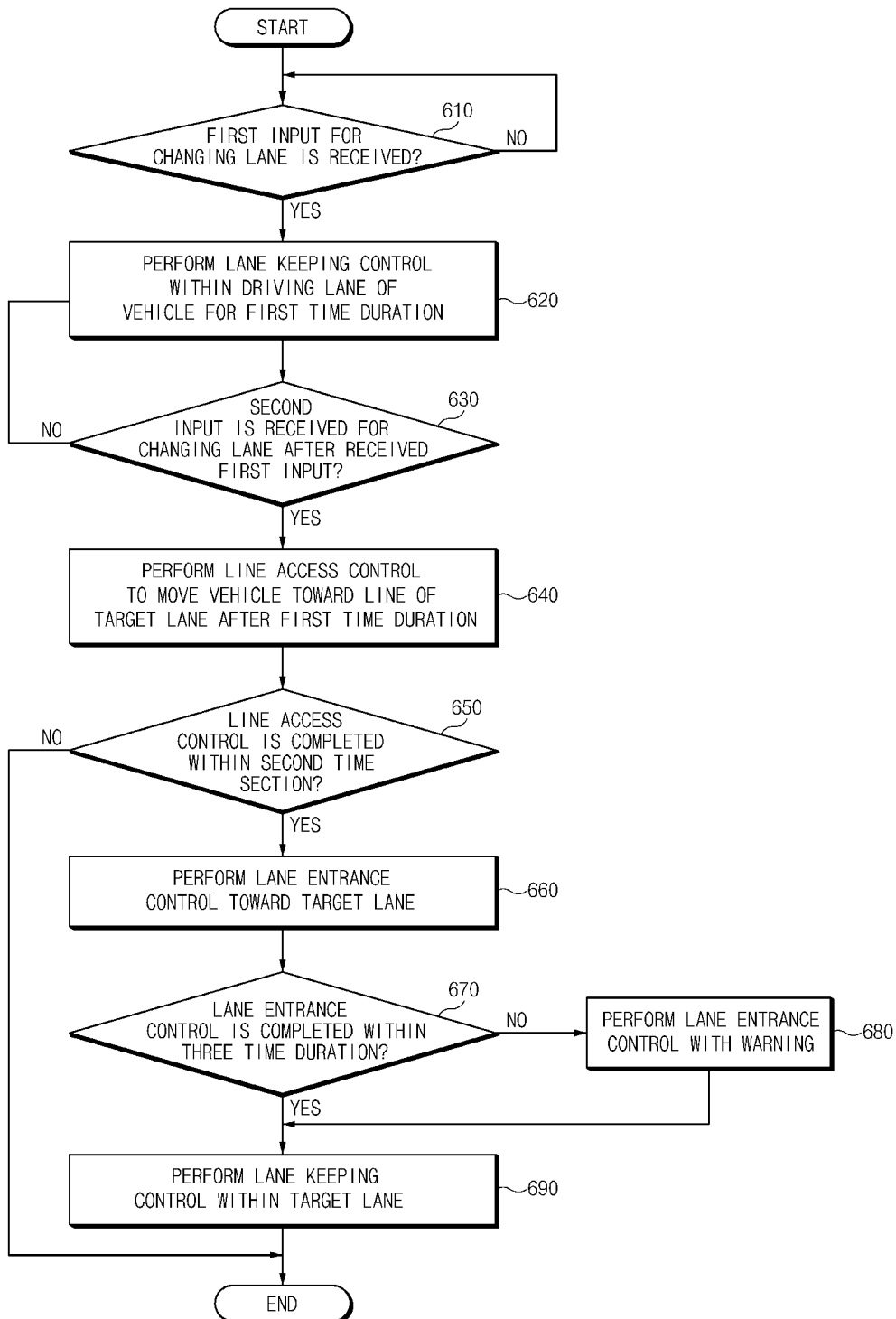
FIG. 6 is a flowchart illustrating a method for controlling the drive of a vehicle.

FIG. 6 is a flowchart illustrating a method for controlling the drive of a vehicle, according to another exemplary form of the present disclosure.

Hereinafter, it is assumed that a vehicle including the vehicle drive controlling apparatus 100 of FIG. 1 performs a processor of FIG. 6. In addition, in the following description made with reference to FIG. 6, the operation described as being performed by the vehicle may be understood as being controlled by the control circuit 140 of the vehicle drive controlling apparatus 100.

Referring to FIG. 6, in operation 610, the vehicle may receive a first input for changing a lane. The vehicle may continuously perform lane keeping control until the first input is received. When the first input is received, the vehicle may perform the lane keeping control on the driving lane of the vehicle for the first time duration, in operation 620. In operation 630, the vehicle may receive a second input for changing the lane after the first input is received. The vehicle may continuously perform lane keeping control when the second input is not received.

When the second input is received, the vehicle may perform a line access control such that the vehicle moves toward a line positioned in a direction of a target lane after the first time duration, in operation 640. In operation 650, the vehicle may determine whether the line access control is completed within the second time duration. When the line access control is not completed within the second time duration, the vehicle may cancel changing of the lane and may perform the lane keeping control on the driving lane. When the line access control is completed within the second time duration, the vehicle may perform the lane entrance control toward the target lane, in operation 660. In operation 670, the vehicle may determine whether the line access control is completed within the third time duration. When the lane entrance control is not completed within the third time duration, the vehicle may perform the lane entrance control together with the warning, in operation 670. When the lane entrance control is completed within the third time duration, the vehicle may perform the lane keeping control together inside the target lane, in operation 690.

Figure 7:
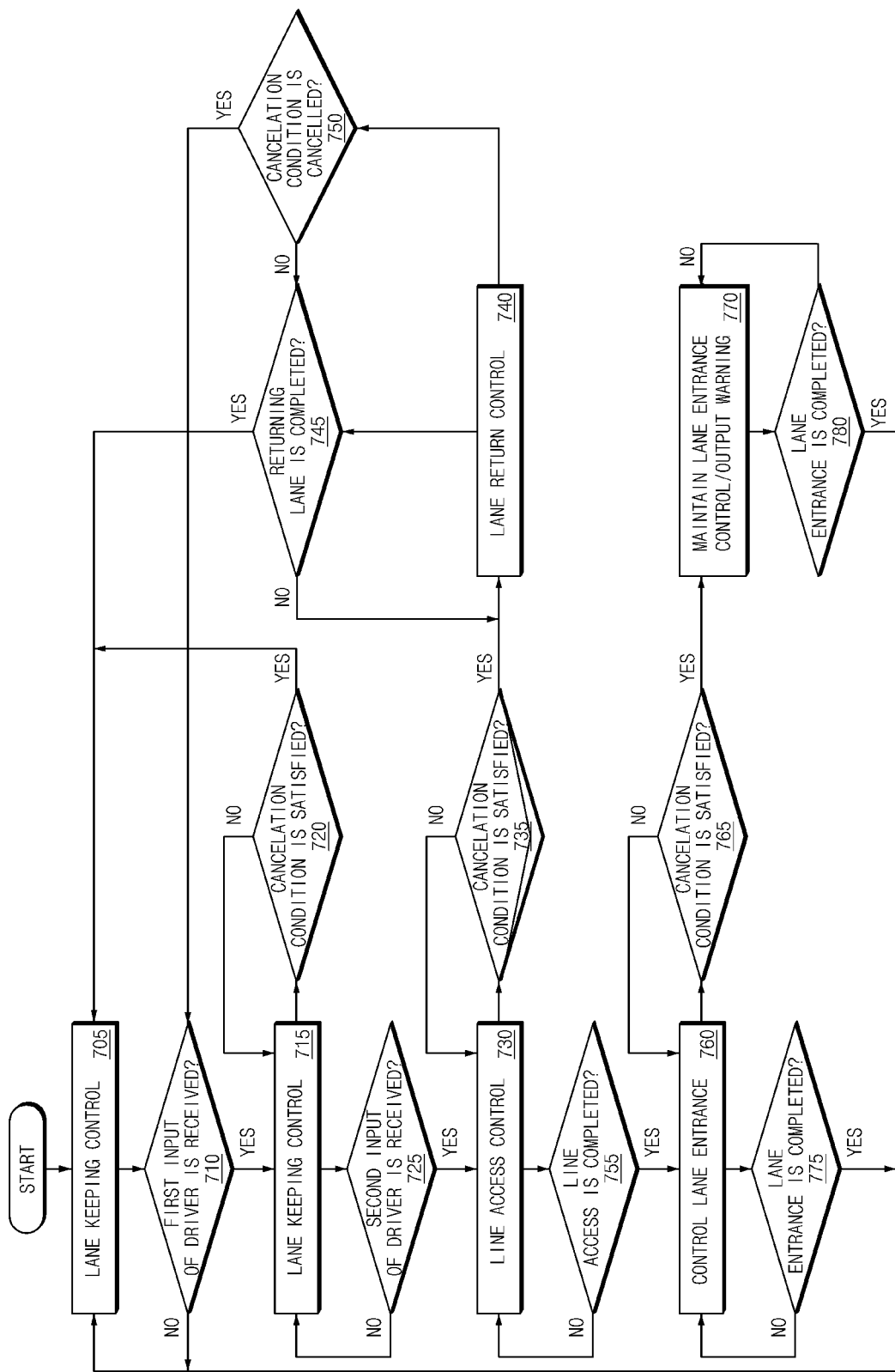
FIG. 7 is a flowchart illustrating a method for controlling the drive of a vehicle.

FIG. 7 is a flowchart illustrating a method for controlling the drive of a vehicle, according to another form of the present disclosure.

Hereinafter, it is assumed that a vehicle including the vehicle drive controlling apparatus 100 of FIG. 1 performs a processor of FIG. 7. In addition, in the following description made with reference to FIG. 7, the operation described as being performed by the vehicle may be understood as being controlled by the control circuit 140 of the vehicle drive controlling apparatus 100.

Referring to FIG. 7, in operation 705, the vehicle may perform lane keeping control. In operation 710, the vehicle may determine whether a first input of a driver is received. The vehicle may continuously perform the lane keeping control until the first input is received. When the first input is received, the vehicle may perform lane keeping control, in operation 715. While the lane keeping control is being performed in operation 715, the vehicle may determine whether the cancellation condition is satisfied in operation 720. When the cancellation condition is satisfied, the vehicle may cancel changing of the lane and may continuously perform the lane keeping control in operation 705. When the cancellation condition is not satisfied, the vehicle may continuously perform the lane keeping control in operation 715.

While the lane keeping control is performed in operation 715, the vehicle may determine whether the second input of the driver is received in operation 725. When the second input is not received, the vehicle may continuously perform the lane keeping control in operation 715. When the second input is received, the vehicle may perform the line access control, in operation 730. While the line access control is being performed, the vehicle may determine whether the cancellation condition is satisfied in operation 735. When the cancellation condition is satisfied, the vehicle may cancel changing of the lane and may perform lane return control in operation 740. When the cancellation condition is not satisfied, the vehicle may continuously perform the line access control.

While the lane return control is being performed, the vehicle may determine whether the lane return is completed in operation 745. When the lane return is completed, the vehicle may perform the lane keeping control in operation 705. While the lane return control is being performed, the vehicle may determine whether the cancellation condition is canceled in operation 750. When the cancellation condition is canceled and when the first input of the driver is received, the vehicle may perform the lane keeping control in operation 715.

While the line access control is being performed, the vehicle may determine whether the line access is completed in operation 755. When the line access is completed, the vehicle may perform lane entrance control in operation 760. While the lane entrance control is being performed, the vehicle may determine whether the cancellation condition is satisfied in operation 765. When the cancellation condition is satisfied, the vehicle may maintain the lane entrance control and may output a warning in operation 770. When the cancellation condition is not satisfied, the vehicle may continuously perform the line access control.

While the lane entrance control is being performed, the vehicle may determine whether the lane entrance is completed in operation 775. Similarly, while the lane entrance control and the warning output are performed, the vehicle may determine whether the lane entrance is completed in operation 780. When the lane entrance is completed, the vehicle may perform the lane keeping control in operation 705.

Figure 8:
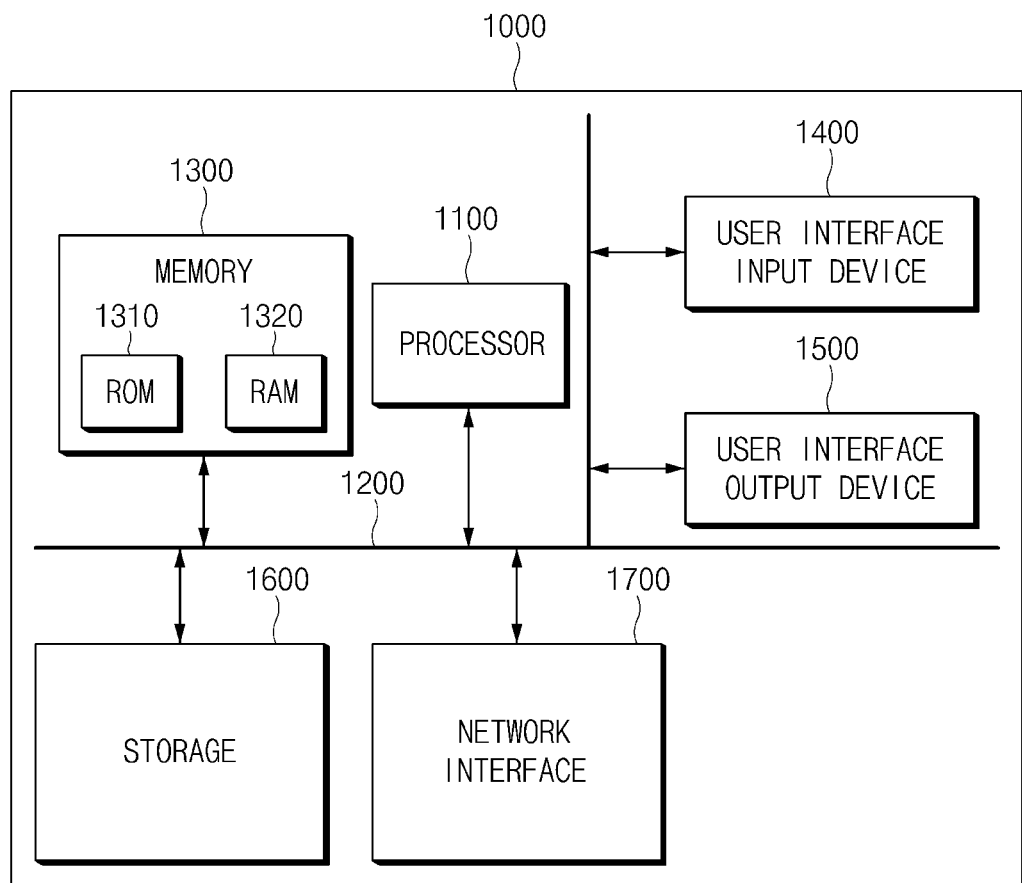
FIG. 8 illustrates a block diagram illustrating a computing system to control the drive of a vehicle.

FIG. 8 illustrates a computing system, according to another form of the present disclosure.

Referring to FIG. 8, a method according to an exemplary form of the present disclosure may be implemented through a computing system. A computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the forms disclosed in the specification may be directly implemented with a hardware module, a software module, or combinations thereof, executed by the processor 1100. The software module may reside on a storage medium (e.g., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). An exemplary storage medium may be coupled to the processor 1100. The processor 1100 may read out information from the storage medium and may write information in the storage medium. Alternatively, the storage medium may be integrated with the processor 1100. The integrated processor and storage medium may reside in an application specific integrated circuit (ASIC). The ASIC may reside in a user terminal. Alternatively, the integrated processor and storage medium may reside as a separate component of the user terminal.

As described above, according to an exemplary form of the present disclosure, the vehicle drive controlling apparatus may provide a strategy of changing the lane based on a specified limited time, thereby improving the safety of the driver. In addition, the control strategy is varied depending on the cancellation condition is satisfied, thereby providing the safety while improving the control efficiency.

Besides, various effects may be directly or indirectly produced through the present disclosure.

While the present disclosure has been described with reference to exemplary forms, it will be apparent to those skilled in the art that various changes and modifications may be made without departing from the spirit and scope of the present disclosure.

Therefore, exemplary forms of the present disclosure are not limiting, but illustrative, and the spirit and scope of the present disclosure is not limited thereto. The spirit and scope and the present disclosure should be interpreted by the following claims, it should be interpreted that all technical ideas which are equivalent to the present disclosure are included in the spirit and scope of the present disclosure.

What is claimed is:

1. An apparatus for controlling drive of a vehicle, the apparatus comprising:
    at least one input device configured to receive an input from a driver of the vehicle; and
    a control circuit electrically connected with the at least one input device,
    wherein the control circuit is configured to:
        perform a lane keeping control on a driving lane of the vehicle for a first time duration, when receiving a first input for changing a lane from the driver through the at least one input device,
        when receiving a second input for changing the lane from the driver through the at least one input device after receiving the first input, determine whether the lane keeping control is completed for the first time duration, and
        when the lane keeping control is completed for the first time duration, perform a line access control by which the vehicle moves toward a line positioned in a direction of a target lane for the changing of the lane, and
        perform a lane entrance control toward the target lane when the line access control is completed within a second time duration.

2. The apparatus of claim 1, wherein the at least one input device includes:
    a first input device and a second input device,
    wherein the first input is received through the first input device, and
    wherein the second input is received through the second input device.

3. The apparatus of claim 2, wherein the first input device is a turn signal lever, and wherein the second input device is a steering wheel, a switch, or a button.

4. The apparatus of claim 1, further comprising:
an output device,
wherein the control circuit is configured to output a message associated with changing the lane through the output device, when receiving the first input.

5. The apparatus of claim 1, wherein the control circuit is configured to:
stop the lane change, when a specified cancelation condition is satisfied while the lane keeping control or the line access control is being performed.

6. The apparatus of claim 5, wherein the specified cancelation condition is satisfied:
when a dangerous situation is sensed; when a system is shut down by the driver; when the system reaches a limit situation; when hands-off of the driver is sensed; when a turn signal lamp is turned off by the driver; when initiation of the changing of the lane is delayed; or when lateral-movement is discontinuous.

7. The apparatus of claim 5, wherein the specified cancelation condition is satisfied when it is predicted that completion of the line access control is impossible within the second time duration.

8. The apparatus of claim 5, wherein the control circuit is configured to:
stop changing the lane and continuously perform the lane keeping control on the driving lane, when the specified cancelation condition is satisfied during the lane keeping control.

9. The apparatus of claim 5, wherein the control circuit is configured to:
stop changing the lane and perform a lane return control to return the vehicle to a centerline of the driving lane, when the specified cancelation condition is satisfied during the line access control.

10. The apparatus of claim 9, wherein the control circuit is configured to:
stop the lane return control, when the specified cancelation condition is canceled during the lane return control; and
perform the line access control, when the first input and the second input are received.

11. The apparatus of claim 1, further comprising:
an output device,
wherein the control circuit is configured to:
output a warning through the output device, and
maintain the lane entrance control, when a specified cancellation condition is satisfied during the lane entrance control.

12. The apparatus of claim 11, wherein the specified cancelation condition is satisfied when it is predicted that completion of the lane entrance control is impossible for a third time duration.

13. The apparatus of claim 1, wherein the control circuit is configured to:
perform the lane keeping control on the target lane, when the lane entrance control is completed within a third time duration.

14. A method for controlling drive of a vehicle, the method comprising:
performing, by a control circuit, a lane keeping control on a driving lane of the vehicle for a first time duration, when receiving a first input for changing a lane from a driver of the vehicle;
when receiving a second input for changing the lane from the driver after receiving the first input, determining whether the lane keeping control is completed for the first time duration;
when the lane keeping control is completed for the first time duration, performing, by the control circuit, a line access control such that the vehicle moves toward a line positioned in a direction of a target lane for the changing of the lane; and
performing, by the control circuit, a lane entrance control toward the target lane when the line access control is completed within a second time duration.

15. The method of claim 14, further comprising:
stopping, by the control circuit, changing the lane, when a specified cancelation condition is satisfied while the lane keeping control or the line access control is being performed.

16. The method of claim 15, wherein stopping changing the lane includes:
stopping changing the lane and continuously performing the lane keeping control on the driving lane, when the specified cancelation condition is satisfied during the lane keeping control.

17. The method of claim 15, wherein stopping changing the lane includes:
stopping changing the lane and performing a lane return control to return the vehicle to a centerline of the driving lane, when the specified cancelation condition is satisfied during the line access control.

18. The method of claim 17, further comprising:
stopping, by the control circuit, the lane return control, when the specified cancelation condition is canceled during the lane return control; and
performing the line access control, when the first input and the second input are received.

19. The method of claim 14, further comprising:
outputting a warning through an output device, and
maintaining the lane entrance control, when a specified cancelation condition is satisfied during the lane entrance control.

20. The method of claim 14, further comprising:
performing, by the control circuit, the lane keeping control on the target lane, when the lane entrance control is completed for a third time duration.

* * * * *